United States Patent
Broadus (10) Patent No.: US 7,203,952 B2
(45) Date of Patent: Apr. 10, 2007

(54) PASSIVE PROGRAM COMPLETION STATUS INDICATOR FOR AN ELECTRONIC PROGRAM GUIDE

(75) Inventor: Charles R. Broadus, Bothell, WA (US)

(73) Assignee: Digeo, Inc., Kirkland, WA (US)

( * ) Notice: Subject to any disclaimer, the term of this patent is extended or adjusted under 35 U.S.C. 154(b) by 930 days.

(21) Appl. No.: 09/820,331

(22) Filed: Mar. 27, 2001

(65) Prior Publication Data

US 2002/0144264 A1    Oct. 3, 2002

(51) Int. Cl.
*H04N 5/445* (2006.01)

(52) U.S. Cl. .......................... 725/40; 725/52

(58) Field of Classification Search ................. 725/40, 725/43, 44, 45, 47, 41, 42; 715/772; 345/440, 345/440.2
See application file for complete search history.

(56) References Cited

U.S. PATENT DOCUMENTS

| | | | |
|---|---|---|---|
| 4,706,121 A | 11/1987 | Young | 358/142 |
| 5,353,121 A | 10/1994 | Young et al. | 348/563 |
| 5,479,266 A | 12/1995 | Young et al. | 358/335 |
| 5,479,268 A | 12/1995 | Young et al. | 358/335 |
| 5,532,754 A | 7/1996 | Young et al. | 348/569 |
| 5,592,551 A | 1/1997 | Lett et al. | 380/20 |
| 5,621,456 A | 4/1997 | Florin et al. | 348/7 |
| 5,623,592 A | 4/1997 | Carlson et al. | 395/348 |
| 5,691,742 A | 11/1997 | O'Connor et al. | 345/116 |
| 5,727,060 A | 3/1998 | Young | 380/10 |
| 5,809,204 A | 9/1998 | Young et al. | 386/83 |
| 5,850,218 A | 12/1998 | LaJoie et al. | 345/327 |
| 5,870,150 A | 2/1999 | Yuen | 248/553 |
| 5,886,746 A | 3/1999 | Yuen et al. | 348/564 |
| 5,940,073 A | 8/1999 | Klosterman et al. | 345/327 |
| 5,970,206 A | 10/1999 | Yuen et al. | 386/83 |
| 5,974,222 A | 10/1999 | Yuen et al. | 386/83 |
| 5,990,890 A | 11/1999 | Etheredge | 345/347 |
| 6,037,933 A | 3/2000 | Blonstein et al. | 345/327 |
| 6,075,575 A | 6/2000 | Schein et al. | 348/734 |
| 6,097,390 A | 8/2000 | Marks | 345/348 |
| 6,151,059 A | 11/2000 | Schein et al. | 348/13 |
| 6,167,188 A * | 12/2000 | Young et al. | 386/83 |
| 6,211,858 B1 | 4/2001 | Moon et al. | 345/146 |
| 6,323,911 B1 | 11/2001 | Schein et al. | 348/552 |
| 6,347,400 B1 * | 2/2002 | Ohkura et al. | 725/60 |
| 6,412,110 B1 * | 6/2002 | Schein et al. | 725/40 |

(Continued)

OTHER PUBLICATIONS

RD 0385007A.*
Office Action mailed Mar. 15, 2004 for U.S. Appl. No. 09/820,083, filed Mar. 27, 2001.

(Continued)

*Primary Examiner*—Christopher Grant
*Assistant Examiner*—Harun Yimam
(74) *Attorney, Agent, or Firm*—Kory D. Christensen; Stoel Rives, LLP (57) ABSTRACT

A line indicating the current time is displayed across at least a portion of an electronic program guide (EPG). The line is perpendicular to the time axis of the EPG and bisects at least one program element of the EPG into an elapsed portion and a remaining portion, each being proportional in size to the time periods represented thereby. The ratio of the elapsed time to the running time of the program is an indication of the completion status of the program. In certain implementations, the line bisects a plurality of elements of the EPG, allowing the user to immediately determine the completion status of a plurality of programs.

25 Claims, 7 Drawing Sheets

U.S. PATENT DOCUMENTS

| | | | |
|---|---|---|---|
| 6,462,784 B1* | 10/2002 | Kohno et al. | 348/563 |
| 6,518,986 B1 | 2/2003 | Mugura | 345/810 |
| 6,600,503 B2 | 7/2003 | Stautner et al. | 345/854 |
| 6,757,906 B1 | 6/2004 | Look et al. | 725/45 |
| 6,782,551 B1 | 8/2004 | Entwistle | 725/46 |
| 2001/0010094 A1 | 7/2001 | Moir | 725/39 |
| 2002/0056087 A1 | 5/2002 | Berezowski et al. | 725/9 |
| 2002/0184627 A1 | 12/2002 | Albn et al | 725/39 |
| 2003/0005445 A1* | 1/2003 | Schein et al. | 725/51 |
| 2003/0154477 A1 | 8/2003 | Hassell et al. | 725/39 |

OTHER PUBLICATIONS

Office Action mailed Oct. 21, 2004 for U.S. Appl. No. 09/820,083, filed Mar. 27, 2001

Office Action mailed Apr. 8, 2005 for U.S. Appl. No. 09/820,083, filed Mar. 27, 2001.

Office Action mailed Jul. 25, 2005 for U.S. Appl. No. 09/820,083, filed Mar. 27, 2001.

Office Action mailed Feb. 27, 2006 for U.S. Appl. No. 09/820,083, filed Mar. 27, 2001.

* cited by examiner

PASSIVE PROGRAM COMPLETION STATUS INDICATOR FOR AN ELECTRONIC PROGRAM GUIDE

BACKGROUND

1. Field of the Invention

The present invention relates generally to electronic entertainment systems, methods, and user interfaces. More specifically, the present invention relates to a system, method, and user interface for providing a passive program completion status indicator in an electronic program guide (EPG).

2. Description of Related Background Art

Due to the ever increasing number of channels provided by cable television (CATV) and satellite networks, an electronic program guide (EPG) has become an essential tool in informing users concerning the time and channel assignments of available programming. Typically, an EPG is embodied as a grid having two axes, one for time slots and the other for channels or stations. Elements formed within the grid correspond to specific media programs.

Often, an EPG displays a "window" or subset of available programming including five to ten channels for one to two hours of time (typically centered around the current time). A user is generally able to scroll the EPG window horizontally or vertically to reveal additional time slots and/or channels.

Despite the advantages of EPGs, current implementations have a number of deficiencies. For example, conventional EPGs do not currently display how much of an ongoing program a user has missed, which may be an important factor in determining whether to watch or record the program. The ratio of the elapsed time of a program to its running time is referred to herein as the program's "completion status." Current EPGs do not provide an indication of completion status for an ongoing program.

In some cases, a conventional EPG may indicate the current time. However, in order to determine how much of an ongoing program the user has missed (i.e. its completion status), the user would need to determine the program's starting and ending time, as well as the current time, and perform a mental calculation.

Such determinations may be hindered by the fact that the representation of the program within the EPG may extend beyond the currently-displayed EPG window. This is often the case with sports programs and movies, which often last more than two hours. Thus, a user may need to scroll the EPG window in one or more directions (e.g., backward and forward in time) in order to determine the starting and ending times of the program.

This process is unnecessarily time-consuming, particularly if the user is examining a number of partially completed programs to determine which one to watch. Furthermore, given the wide variety of entertainment options and the limited amount of time available to individuals for entertainment, any advancement lending to the convenience and user-friendly nature of an entertainment package can add value and significantly increase the utility of an entertainment system.

Accordingly, there is a need for a system, method, and user interface that overcomes the limitations of the prior art. The system should provide users with the ability to rapidly, even instantaneously, determine the completion status for one or more ongoing programs represented within an EPG.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

The present invention solves the foregoing problems and disadvantages by providing a system, method, and user interface for displaying a completion status indicator for one or more media programs within an electronic program guide (EPG). By providing such an indicator, a user may instantly know how much of a media program he or she has missed, without the need to determine the program's starting or ending time or to perform any mental calculations.

In one embodiment, a line indicating the current time may be displayed across at least a portion of the EPG. The line may be perpendicular to the time axis of the EPG and bisects at least one element of the EPG into an elapsed portion and a remaining portion, each being proportional in size to the time periods represented thereby. In certain implementations, the line bisects a plurality of elements of the EPG, allowing the user to immediately determine the completion status of a plurality of media programs.

Where a displayed element extends beyond the current EPG window, a separate visual indication of completion status may be displayed. The separate visual indication may be embodied, for example, as a pie chart, a ratio bar graph, and/or a numeric value indicating a completion status of a corresponding media program.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Additionally, throughout the following disclosure, the term "coupled" may be used to refer to components that are either in direct communication or linked by one or more other components. Thus, as used herein, the term "coupled" may be synonymous with "in electrical communication with" or simply "in communication with."

Figure 1:
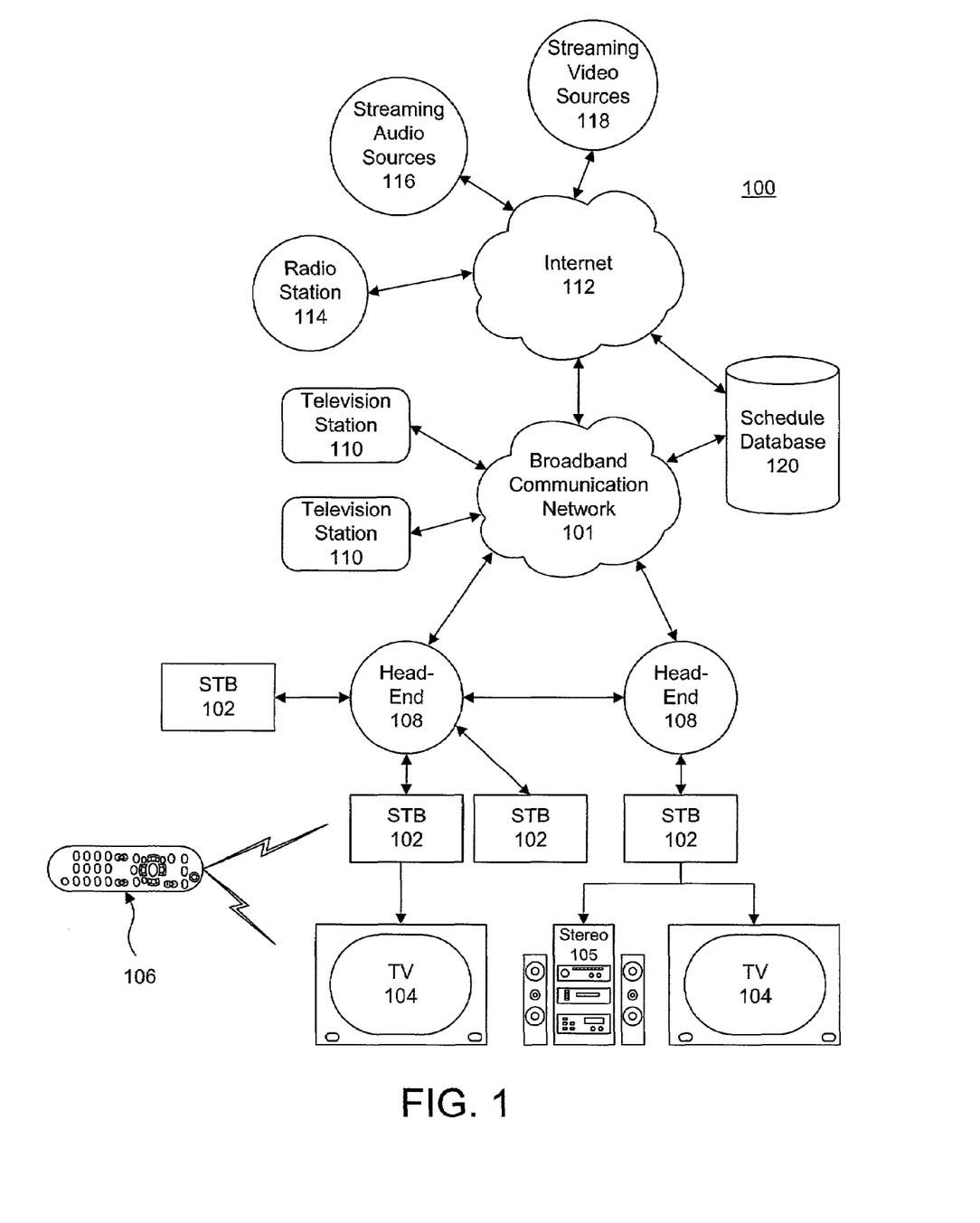
FIG. 1 is a block diagram of a system for delivering various forms of media to a plurality of users.

FIG. 1 illustrates a system 100 for delivering television programs and other forms of media to plurality of customers. In one implementation, the system 100 includes a broadband communication network 101, such as a cable network. However, other networks are contemplated, including, for example, a satellite network.

In one configuration, the system 100 includes a plurality of set top boxes (STBs) 102 located, for instance, at customer homes. Generally, an STB 102 is a consumer electronics device that serves as a gateway between a customer's television 104 and the network 101. In alternative embodiments, an STB 102 may be embodied as a personal computer, an advanced television set, or another type of client terminal.

In one embodiment, an STB 102 receives encoded media programs from the network 101 and decodes the same for display on a coupled television 104 or other display device (such as a computer monitor, flat panel display, projection screen, or the like). As its name implies, an STB 102 is typically located on top of, or in close proximity to, the television 104. The STB 102 may also be coupled to a stereo system 105, which may include, for instance, a stereo receiver, speakers, and other standard components for reproducing audio signals with a high degree of fidelity.

Each STB 102 may be distinguished from other network components by a unique identifier, number, code, or address, examples of which include an IP (Internet Protocol) address or media access control (MAC) address. Thus, video streams and other information may be transmitted from the network 101 to a specific STB 102 by specifying the corresponding address, after which the network 101 routes the transmission to its destination using conventional techniques.

A remote control device 106 is provided, in one embodiment, for convenient remote operation of the STB 102 and the television 104. If desired, the remote control 106 may take the form of separate remote control devices for the STB 102, television 104, or stereo 105. The remote control 106 may use infrared (IR), radio frequency (RF), or other wireless technologies to transmit control signals to the STB 102, television 104, or stereo 105. Other remote control devices are also contemplated, such as wireless keyboards and webpads (not shown).

In one embodiment, each STB 102 is coupled to the network 101 via a head-end 108 or other distribution node. In the context of a cable network, a head-end 108 is generally a centrally-located facility where television programs are received from a local cable TV (CATV) satellite downlink and packaged together for transmission to customer homes. In one configuration, a head-end 108 also functions as a Central Office (CO) in the telephone industry, routing video streams and other data to and from the various STBs 102 serviced thereby.

The network 101 is preferably coupled to one or more television stations 110, which provide television programming for distribution to the STBs 102. Additionally, the network 101 may be coupled to one or more radio stations 114, streaming audio sources 116, or streaming video sources 118, each of which may be accessible, for example, via the Internet 112. The Internet 112 is a "network of networks" and is well known to those skilled in the art. Communication over the Internet 112 is accomplished using standard protocols, such as TCP/IP (transmission control protocol/Internet protocol) and the like.

In one configuration, a schedule database 120 is coupled to one or both of the broadband communication network 101 and the Internet 112. The schedule database 120 preferably maintains schedule information for past, present, and future media programs broadcast by a plurality of media providers. Media providers include, for example, television stations 110, radio stations 114, streaming audio sources 116, and streaming video sources 118. Throughout the following disclosure, the term "broadcast" is not limited to electromagnetic transmissions, but contemplates packetized transmissions using a network, such as the Internet 112. The schedule database 120 may be implemented using any conventional relational or hierarchical database management system (DBMS) or the like.

In one implementation, the schedule database 120 receives media program schedule information directly from media providers via the Internet 112, using, for example, the hypertext transfer protocol (HTTP) or the file transfer protocol (FTP). In such an embodiment, updates of the database may be fully automated. However, in other embodiments, the program schedule information may be manually updated from disks, CD-ROMS, tapes, or the like.

Figure 2:
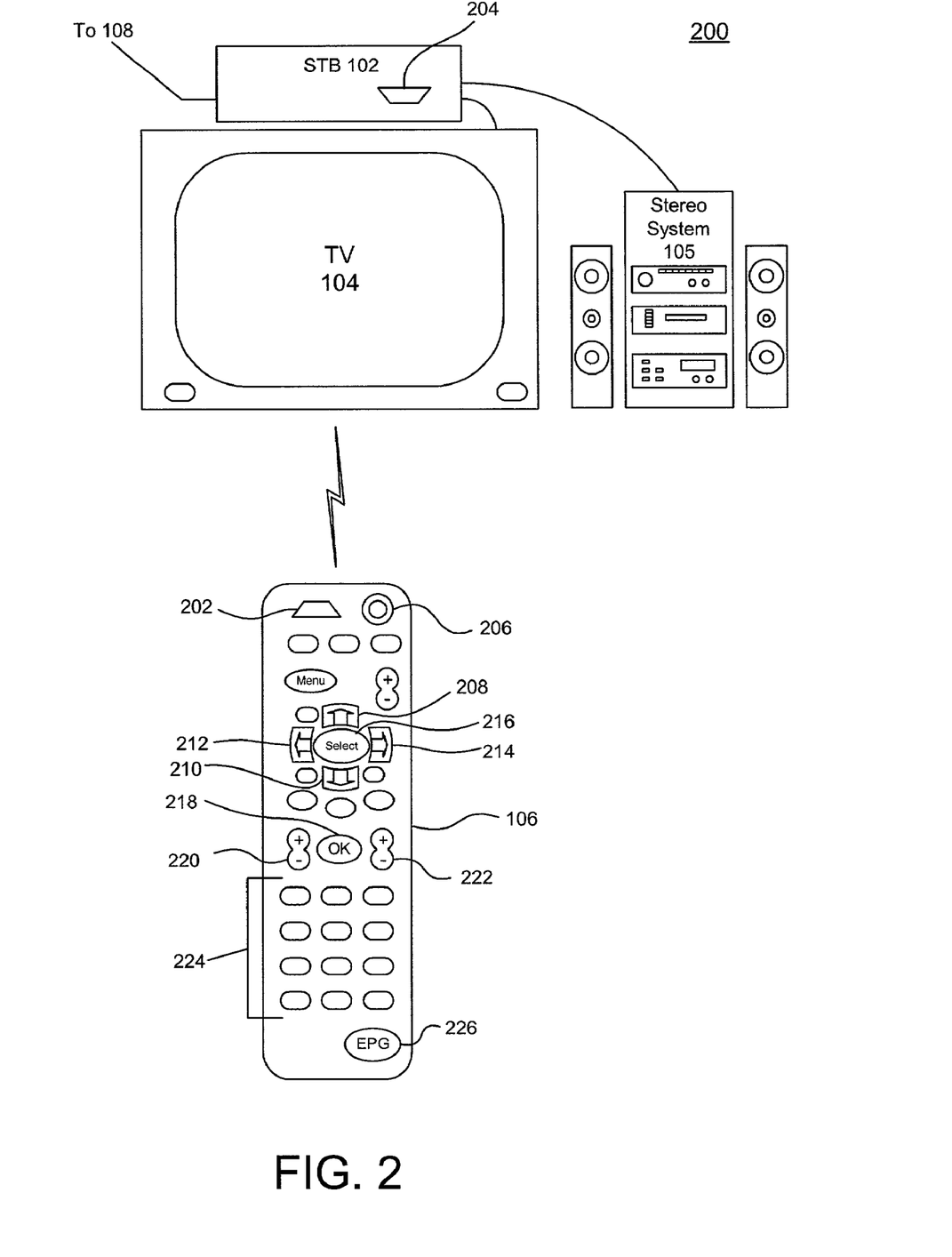
FIG. 2 is an illustration of an interactive television system including a remote control and a set top box.

Referring now to FIG. 2, there is shown an interactive television system 200 according to an embodiment of the invention. As depicted, the system 200 may include an STB 102, a television 104 (or other display device), and a remote control 106. The system 200 may optionally include a stereo system 105 for high-fidelity audio reproduction.

As noted, the remote control 106 is provided for convenient remote operation of the STB 102 and television 104. In certain embodiments, the remote control 106 may also be configured to operate the stereo system 105. Preferably, control signals are transmitted from a wireless transmitter 202 in the remote control 106 to a wireless receiver 204 in the STB 102 (television 104 and/or stereo system 105).

In the depicted embodiment, the remote control 106 includes a plurality of buttons or similar controls. For instance, the remote control 106 may include a power button 206, an up arrow button 208, a down arrow button 210, a left arrow button 212, a right arrow button 214, a "Select" button 216, an "OK" button 218, channel buttons 220, volume buttons 222, alphanumeric buttons 224, and an "EPG" button 226. The functions of certain of the above-identified buttons will be discussed in greater detail below.

Figure 3:
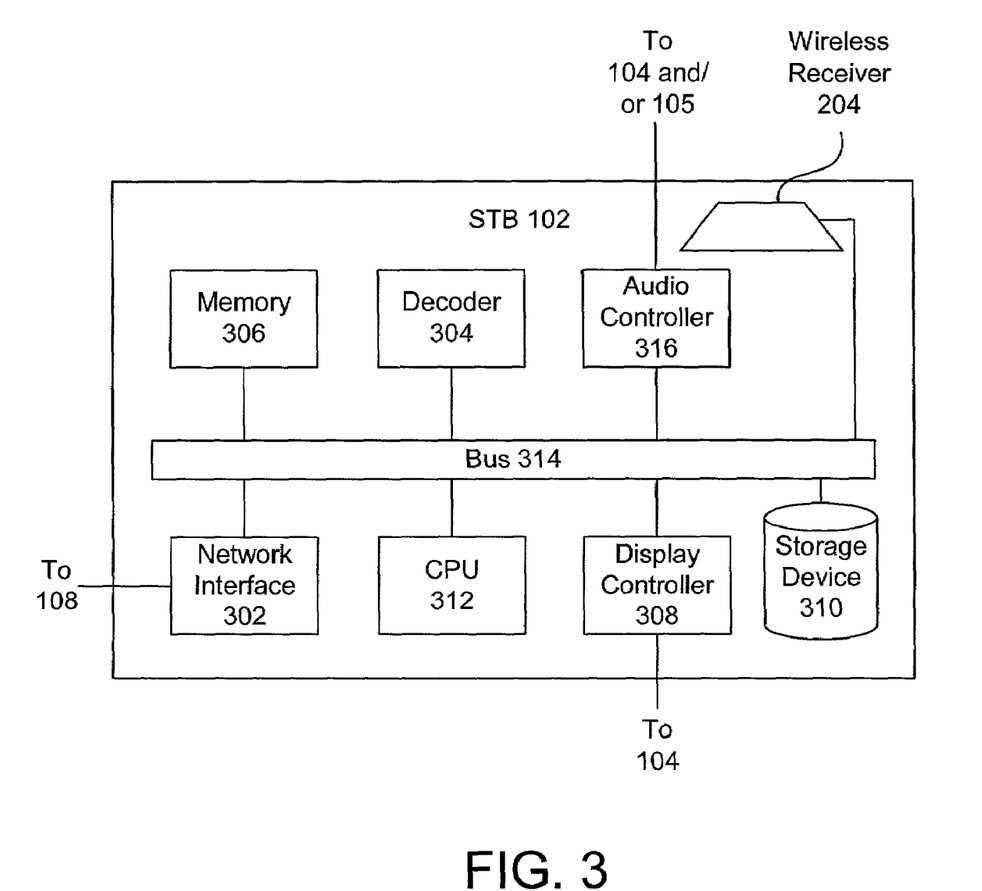
FIG. 3 is a detailed block diagram of a set top box.

Referring now to FIG. 3, there is shown a physical block diagram of an STB 102 according to one embodiment of the invention. As noted above, the STB 102 includes a wireless receiver 204 for receiving control signals sent by the wireless transmitter 202 in the remote control 106. In various embodiments, the receiver 204 may be configured to receive IR, microwave, VHF, UHF, or other electromagnetic frequencies.

The STB 102 also includes, in one implementation, a network interface 302 for communicating with the network 101 via the head-end 108. The interface 302 may include conventional tuning circuitry for receiving MPEG (Moving Picture Experts Group) packets for a selected television channel. The interface 302 may also include conventional cable modem circuitry for sending or receiving other types of data. For example, the interface 302 may conform to the DOCSIS (Data Over Cable Service Interface Specification) or DAVIC (Digital Audio-Visual Council) cable modem standards.

In one implementation, the STB 102 also includes a decoder 304, such as an MPEG decoder, for decoding packets received from the network 101. As depicted, the decoder 304 may be implemented as a hardware component. Alternatively, or in addition, software decoding may be used.

The STB 102 further includes a memory device 306, such as a random access memory (RAM), configured to store data for temporary use. Similarly, a read-only memory (ROM) may be provided for storing more permanent data, such as fixed code and configuration information.

In one embodiment, a display controller 308 is provided for converting decoded digital video information into analog signals for display on the television 104 or other display device. In alternative embodiments, the display controller 308 may provide a direct, digital video output for televisions 104 or video monitors equipped to receive the same. Preferably, the display controller 308 includes graphics hardware for performing bit-block transfers (bit-blits) and other graphical operations. Thus, the display controller 308 may be configured to display a user interface (UI) on the television 104.

In some implementations, the STB 102 may include a storage device 310, such as a hard disk drive or the like. The storage device 310 may be configured to record encoded television broadcasts and retrieve the broadcasts at a later time for decoding by the decoder 304 and display by the display controller 308. By tracking the user's habits, the STB 102 may store media programs automatically. Media programs may also be stored at the specific request of the user.

The storage device 310 may also be used in various embodiments to store viewer preferences, parental lock settings, EPG data, programming preferences, passwords, e-mail messages, information requests, and the like. In one implementation, the storage device 310 also stores an operating system (OS) for the STB 102, such as Windows CE® or Linux®.

A CPU 312 controls the operation of the STB 102, including the other components thereof, which are coupled to the CPU 312 via a bus 314. The CPU 312 may be embodied as a microprocessor, a microcontroller, a digital signal processor (DSP), application specific integrated circuit (ASIC), field programmable gate array (FPGA), or other device known in the art. As noted above, the CPU 312 may perform various operations based upon control signals generated by the remote control 106 and transmitted to the receiver 204.

In selected embodiments, an audio controller 316 is provided for converting decoded digital audio information into analog signals to be transmitted to the television 104 and/or stereo 105. In alternative embodiments, the audio controller 316 may provide a direct, digital audio output (e.g., AC-3) for televisions 104 and/or stereos 105 equipped to receive the same.

The media programs need not actually be broadcast via electromagnetic signals. Some media programs may be transmitted via the Internet 112. Various software tools are known for receiving digitally-encoded and packetized media programs, one particular example of which is RealPlayer Plus®, available from RealNetworks, Inc. of Seattle, Wash. In alternative embodiments, however, the media program reception may be implemented in hardware or firmware.

The STB 102 may be configured to receive and play both streaming and non-streaming audio and video files. Streaming audio and video is downloaded in a series of packets, the first packets being played by the STB 102 while subsequent packets are being downloaded. Again, various known computer programs are available for reading and processing streaming audio and video, including the previously mentioned RealPlayer Plus®. The Internet 112, for example, contains numerous streaming audio sources 116 and streaming video sources 118. This system also contemplates receiving and playing of non-streaming audio and video files, where the entire file is downloaded to the STB 102 before viewing or listening begins. Such files may be stored on the storage device 310 or in memory 306.

Preferably, the STB 102 is capable of simultaneously receiving a plurality of media programs from different media providers. The maximum number of media programs that can be simultaneously received is primarily limited by the bandwidth of the STB's 102 connection to the Internet 112. In the case of a broadband communication network 101, the bandwidth is relatively high, allowing for simultaneous retrieval of a large number of media programs.

Of course, FIG. 3 illustrates only one possible configuration of an STB 102. Those skilled in the art will recognize that various other architectures and components may be provided within the scope of the invention. In addition, various standard components of a typical STB 102 are not illustrated in order to avoid obscuring aspects of the invention.

Figure 4:
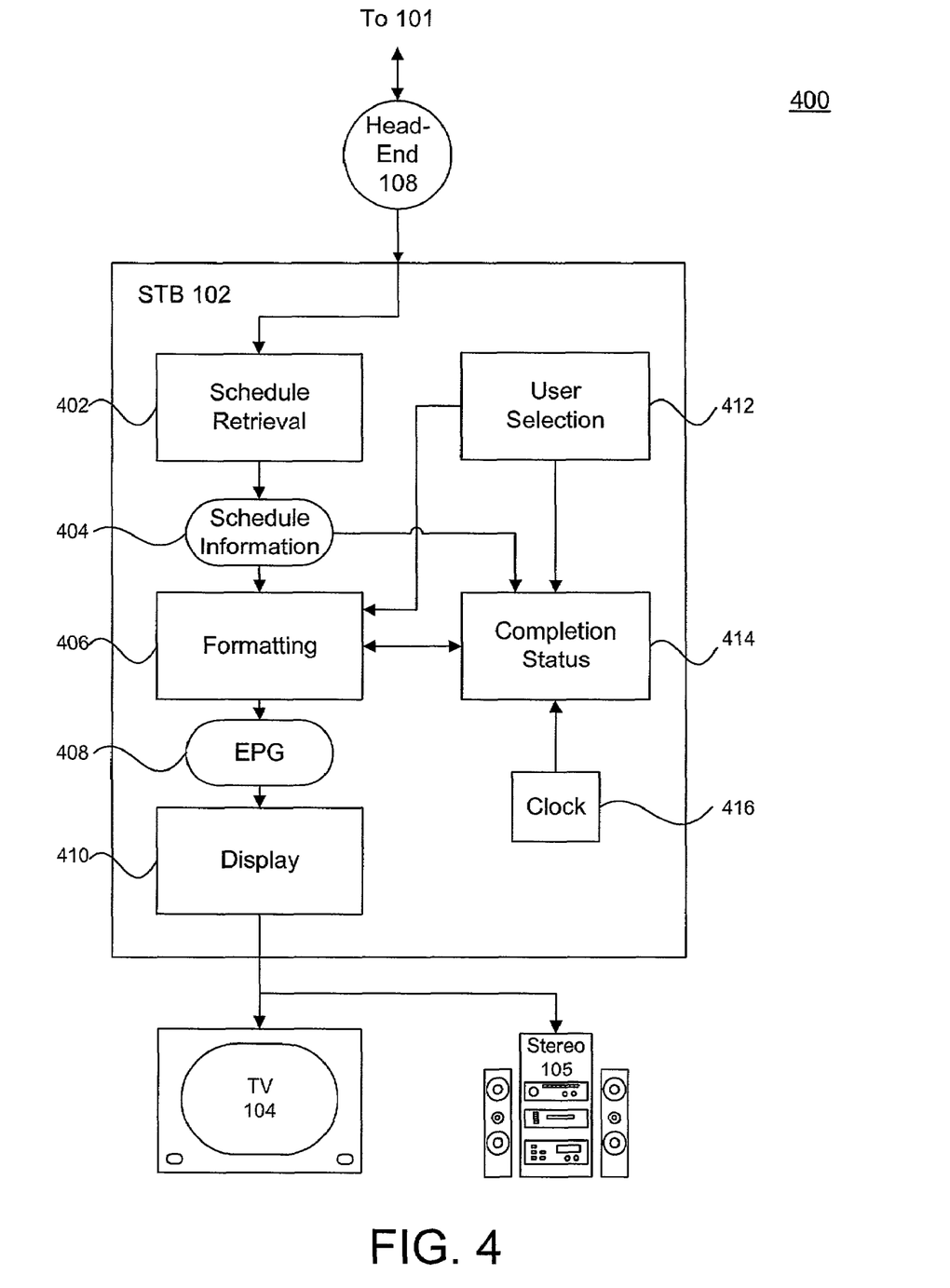
FIG. 4 is a block diagram of the logical components of a system and method for displaying completion status information in the context of an electronic program guide (EPG)

FIG. 4 is a block diagram of logical components of a system 400 for providing a completion status indication for one or more media programs. The depicted logical components may be implemented using one or more of the physical components shown in FIG. 3. Additionally, or in the alternative, various logical components may be implemented as software modules stored in the memory 306 and/or storage device 310 and executed by the CPU 312. Those skilled in the art will recognize that various illustrated components may be combined together or integrated with standard components in various configurations without departing from the scope or spirit of the invention.

In the depicted embodiment, a schedule retrieval component 402 retrieves media program schedule information 404 from the database 120 shown in FIG. 1. The schedule retrieval component 402 may utilize, for example, the network interface 302 of FIG. 3 to receive a packet stream containing the schedule information 404 from a head-end 108 or other distribution node of the network 101.

The schedule information 404 may be retrieved upon demand, e.g., when requested by the user, or at periodic intervals. Furthermore, the retrieved schedule information 404 may be cached within the memory 306 or the storage device 310 of the STB 102 for future reference. The format of the media program schedule information 404 is not crucial to the invention. For example, the information 404 may be encapsulated within one or more tables of a relational database, within an XML (eXtensible Markup Language) document, within a delimited text document, or the like.

In one embodiment, the schedule retrieval component 402 retrieves only a subset of the information 404 available in the database 120. For instance, the schedule retrieval component 402 may only retrieve the current day's schedule information 404 for the user's favorite media providers (which may be specified by the user or determined from historical user selections). However, the user may request retrieval of more comprehensive schedule information 404, if desired.

Figure 5:
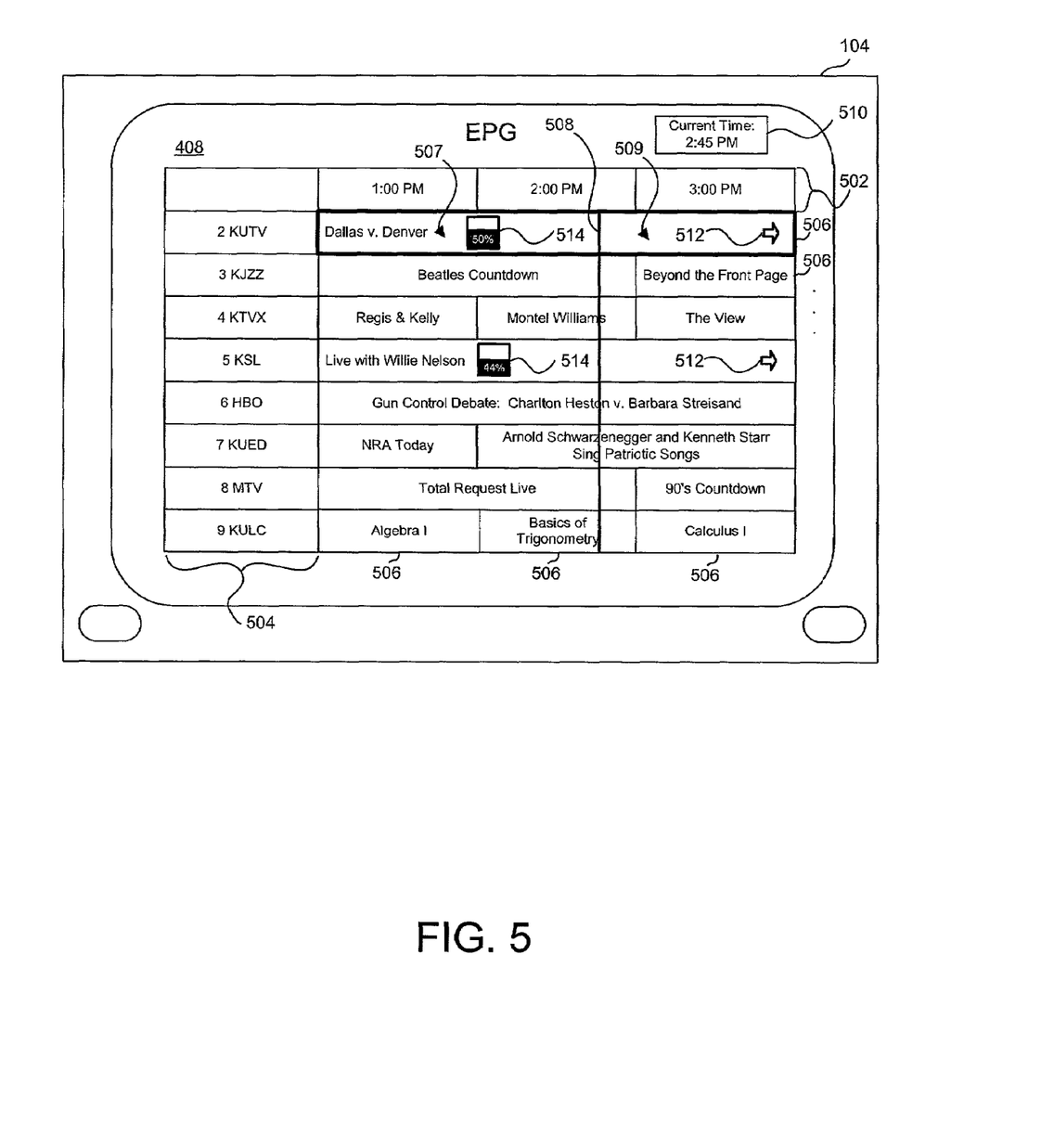
FIG. 5 is a screen layout of one embodiment of an EPG including a completion status indicator.
Figure 6:
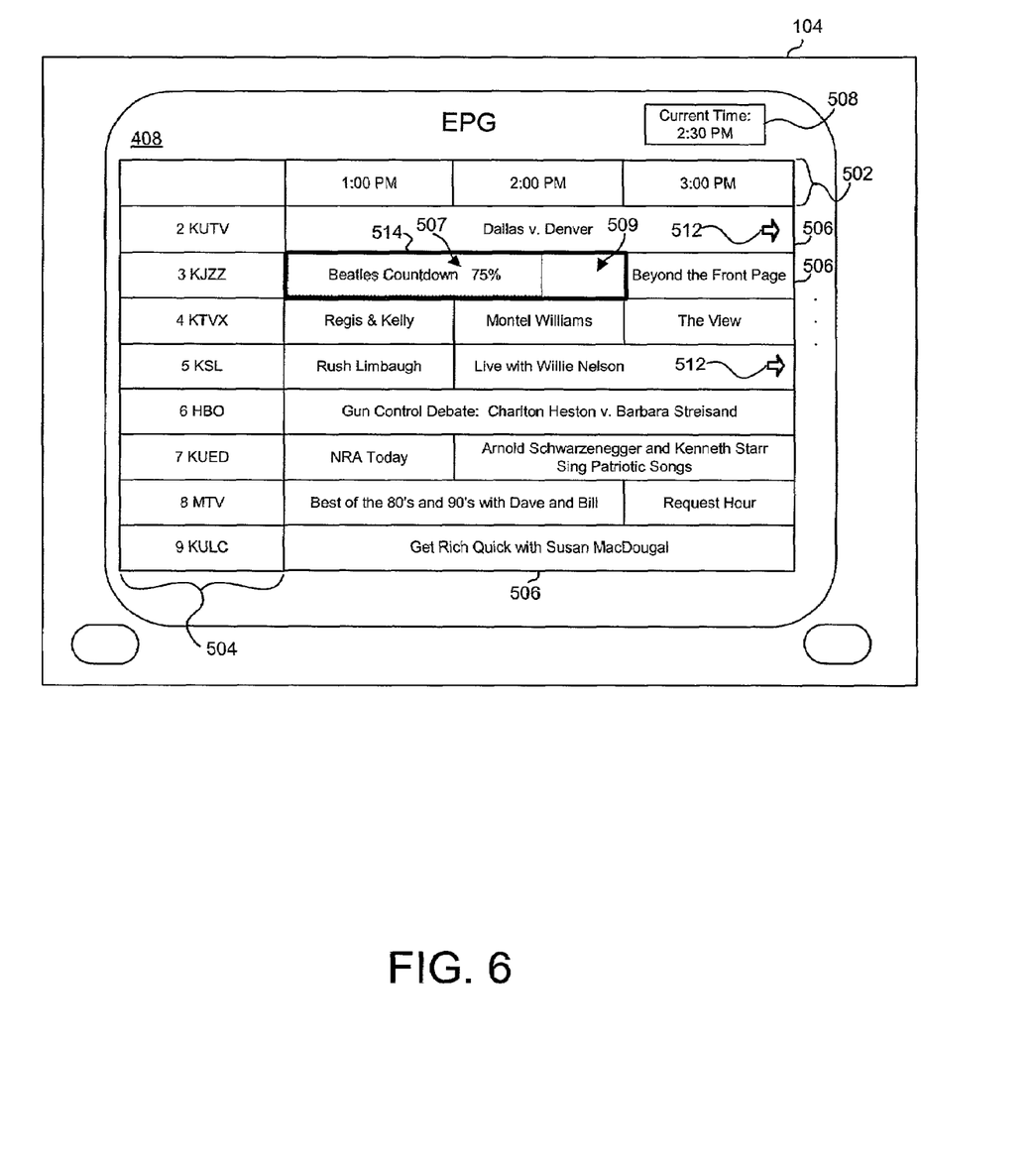
FIG. 6 is a screen layout of another embodiment of an EPG including a completion status indicator.
Figure 7:
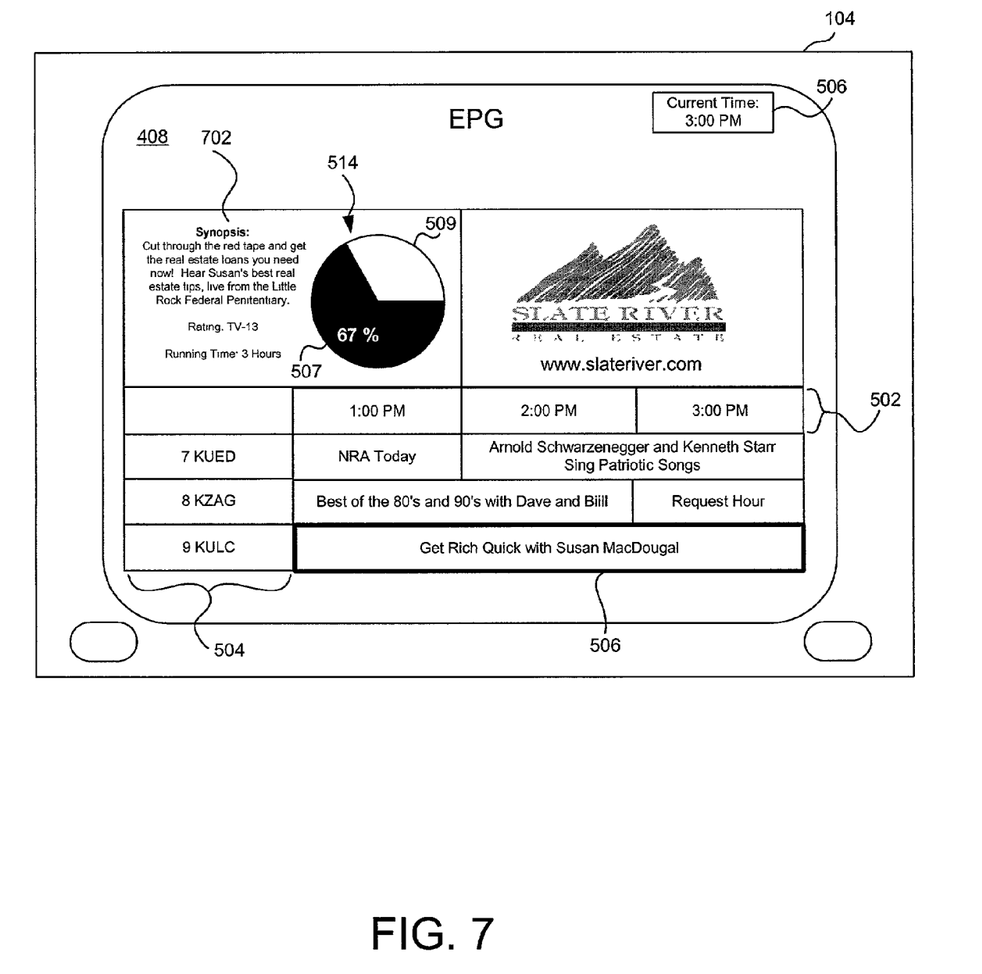
FIG. 7 is a screen layout of yet another embodiment of an EPG including a completion status indicator.

In one embodiment, a formatting component 406, coupled to the schedule retrieval component 402, arranges the raw schedule information 404 into a suitable format for display to the user. As described in greater detail below, the formatting component 406 may arrange the schedule information 404 into an electronic program guide (EPG) 408, embodiments of which are shown in FIGS. 5–7. Techniques for generating a standard EPG 408 are described in U.S. Pat. No. 5,532,754, for "Background Television Schedule System," which is incorporated herein by reference.

A display component 410, coupled to the formatting component 406, receives the formatted EPG 408 and displays the same on the television 104 or other display device. In certain embodiments, the display component 410 may be configured to display a media program simultaneously with the EPG 408, for example, by splitting the television display screen between the television program and the EPG 408.

In various embodiments, the EPG 408 may be displayed in response to a user pressing a specifically-designated button (such as the "EPG" button 226) on the remote control 106. Alternatively, the EPG 408 may be displayed in response to the selection of a menu item or control from a user interface (not shown) displayed on the television 104.

In one implementation, a user selection component 412, coupled to the formatting component 406, permits a user to select a media program displayed in the EPG 408. For example, using the arrow buttons 208, 210, 212, 214 of the remote control 106 (illustrated in FIG. 2), the user may highlight or otherwise mark a particular media program. Thereafter, the STB 102 may display or record the selected media program, or perform other functions, as desired by the user.

The STB 102 may also include a completion status component 414 for displaying an indication of the completion status of one or more media programs represented within the EPG 408. As noted above, the term "completion status" may refer to the ratio of the elapsed time of a program to its running time. Providing an indication of completion status allows a user to know how much of a ongoing program the user has missed. As explained in detail below, the completion status may be indicated, in various embodiments, as a numerical percentage, a ratio bar graph, a pie chart, or other suitable indicator.

In one embodiment, the completion status component 414 is in communication with the formatting component 406 and/or the display component 410 in order to add a completion status indication to the EPG 408 for one or more media programs. In alternative embodiments, the completion status component 414 may be integrated with the formatting component 406 and/or the display component 410.

The completion status component 414 may also be in communication with a clock 416 in order to obtain an indication of the current time. To ensure that the current time is accurate, the clock 416 may be configured to periodically synchronize itself using timing signals received with television broadcasts or using time/date servers on the Internet 112.

The completion status component 414 is also in communication with the schedule retrieval component 402 and/or the formatting component 406 in order to obtain starting and ending time data for one or more media programs. Combining this data with the indication of the current time, the completion status component 414 may calculate an elapsed time, a remaining time, and a percentage of the elapsed time with respect to the running time, for one or more programs represented within the EPG 408. For example, the elapsed time may be calculated by subtracting the starting time from the current time, while the remaining time may be calculated by subtracting the current from the ending time.

FIG. 5 illustrates one configuration of an EPG 408 according to an embodiment of the invention. As depicted, the EPG 408 may be embodied in a standard grid configuration including a time axis 502 (corresponding to a plurality of time slots) and a provider axis 504 (corresponding to a plurality of media providers). Within the grid are displayed a plurality of elements 506 representing media programs, e.g., television programs, radio programs, streaming audio programs, or streaming video programs. Each element 506 is preferably aligned with the time axis 502 of the EPG 408 and is preferably proportional in length to the running time of the corresponding program.

In the depicted embodiment, the completion status of one or more media programs is indicated by a line 508 displayed across at least a portion of the EPG 408. The line 508 may be perpendicular to the time axis 502 of the EPG 408 and may intersect the time axis 502 at a location corresponding to the current time.

In one configuration, the line 508 bisects at least one displayed element 506 representing a media program into an elapsed portion 507 and a remaining portion 509. The elapsed portion 507 indicates how much of the corresponding media program has already been broadcast, while the remaining portion 509 indicates how much of the corresponding media program remains to be broadcast. The relative sizes of the elapsed and remaining portions are preferably proportional to the time periods represented thereby. Accordingly, the combination of the elapsed and remaining portions 507, 509 represents the running time of the program.

In certain implementations, the line 508 bisects a plurality of elements of the EPG 408, allowing the user to immediately determine the completion status of a plurality of media programs. For example, as shown in FIG. 5, the line 508 may extend along the entire length of the provider axis 504.

The line 508 may be semitransparent in order to not occlude any text or graphics being displayed on the EPG 408. Although the line 508 is depicted as being solid in FIG. 5, broken or dotted lines are also within the scope of the invention.

In one embodiment, the completion status component 414 moves the line 508 along the time axis 502 (e.g., from left to right in FIG. 5) with the passage of time. Alternatively, the line 508 remains in the same position, while the time axis 502 and elements 506 are moved with the passage of time in the opposite direction (e.g., from right to left in FIG. 5).

Because some media programs are longer than the time frame represented by the current EPG window, the starting or ending portions of certain elements 506 may not be displayed. For example, as shown in FIG. 5, a portion of the element 506 corresponding to the "Dallas v. Denver" program extends beyond the EPG window. In one configuration, an arrow 512, or other indicator, is placed on the element 506 to notify the user that the element 506 extends beyond the currently-displayed EPG window.

Where a portion of an element 506 is not displayed, the line 508 may not correctly indicate the completion status of the corresponding media program. For example, if the "Dallas v. Denver" program is schedule to run for 3½ hours, the line 508 would appear to indicate that program is approximately 60% complete, whereas it is actually only 50% complete.

Accordingly, in such a case, a separate visual indication 514 of the completion status of the media program may be displayed, either on the element 506, itself, or at another suitable location within the EPG 408. The visual indication 514 may be embodied in various forms, such as a ratio bar graph (as shown in FIG. 5), a pie chart, or other similar indicator.

Alternatively, or in addition, the visual indication 514 may include a numerical percentage of the elapsed time of the program with respect to the running time thereof. The numerical percentage may be displayed on the visual indication 514, itself, or may be displayed in another suitable location on the EPG 408.

In the above-described embodiment, an indication of program's completion status is displayed without the necessity of user input. Hence, the line 508 may be referred to as a "passive" program status completion indicator.

However, in an alternative embodiment, as shown in FIG. 6, an indication of completion status for a particular media program may be displayed in response to a user actively selecting a corresponding element 506 from the EPG 408 (using, for example, the arrow buttons 208, 210, 212, 214 of the remote control 106). Accordingly, the below-described completion status indicator may be described as "active."

Once an element 506 has been selected, the completion status component 414 determines the elapsed and remaining times of the program based upon the current time (from the clock 416) and the program's starting and ending times. The completion status component 414 may also determine a numerical percentage of the elapsed time of the program with respect to its running time.

Thereafter, the completion status component 414 displays a visual indication 514 of the completion status of the selected program, either on the corresponding element 506, itself, or at another suitable location within the EPG 408. As shown in FIG. 6, the visual indication 514 may be embodied as a ratio bar graph, which includes an elapsed portion 507 and a remaining portion 509 corresponding to the elapsed and remaining times of the selected program. Alternatively, the visual indication 514 may be embodied as a pie chart, numerical percentage, or the like. The visual indication 514 may be semitransparent so as to not obscure text or graphics being displayed on the EPG 408.

In one embodiment, the visual indication 514 is superimposed over the selected element 506. For instance, as shown in FIG. 6, the visual indication 514 may be aligned with the time axis 502 and may have the same length as the element 506 to indicate the same time periods. Additionally, the elapsed and remaining portions 507, 509 of the visual indication 514 are preferably sized to represent proportional time periods within the EPG 408.

The elapsed and remaining portions 507, 509 may be distinguished by color, pattern, or another suitable visual distinction. For example, in one embodiment, the elapsed portion 507 may be indicated by the color red, which is commonly associated with completion, termination, or the like. Thus, if the user perceives the visual indication 514 to be almost entirely red, he or she will know that the program is almost completed.

FIG. 7 illustrates yet another embodiment of the EPG 408 in which a visual indication 514 of a completion status is displayed in response to a user selection of an element 506. In this embodiment, however, the visual indication 514 is displayed in an information panel 702, or the like, of the EPG 408. The information panel 702 may also be configured to display a synopsis, a rating, a running time, and other information concerning the selected program.

The visual indication 514 is depicted as a pie chart, with an elapsed portion 507 and a remaining portion 509. Of course, a ratio bar graph or other similar indicator may be used within the scope of the invention. Moreover, a numerical percentage indicating the completion status of the media program may also be provided.

Based on the foregoing, the present invention offers a number of advantages not available in conventional approaches. By indicating the completion status of a media program represented within an EPG 408, a user may quickly determine how much of the media program he or she has missed, without the need for determining starting and ending times or performing mental calculations. The present invention is capable of providing an indication of completion status for a plurality media programs, for a user-selected program, and even for a program that is not fully displayed within a currently-displayed EPG window.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

I claim:

1. A method for indicating a completion status of a media program, the method comprising:
    displaying an electronic program guide (EPG) having first and second axes and a plurality of elements, the first axis corresponding to a plurality of media providers, the second axis corresponding to a plurality of time slots, each element corresponding to a media program;
    displaying a line indicating a current time across at least a portion of the EPG, wherein the line is perpendicular to the second axis and bisects an element of the EPG into an elapsed portion and a remaining portion, the elapsed portion being proportional in size to an elapsed time of a media program corresponding to the element, and the remaining portion being proportional in size to a remaining time thereof;
    generating a separate graph of elapsed time versus running time for a first media program when a portion of the element corresponding to the first media program cannot be displayed within the plurality of time slots currently associated with the second axis, the graph indicating to a user the elapsed proportion of the first media program without requiring the user to refer to other portions of the EPG indicating a start time and an end time associated with the first media program; and
    positioning the separate graph upon the corresponding element in the EPG, the graph being automatically displayed without the necessity of user input.

2. The method of claim 1, wherein the line bisects a plurality of elements of the EPG.

3. The method of claim 1, wherein the media program is selected from the group consisting of a television program, a radio program, a streaming video program, and a streaming audio program.

4. The method of claim 1, further comprising:
    moving the line along the second axis to indicate a change in the current time.

5. The method of claim 1, wherein the separate graph is selected from the group consisting of a pie chart and a ratio bar graph.

6. The method of claim 1, wherein the separate graph comprises an elapsed portion and a remaining portion, the elapsed portion being proportional in size to an elapsed time of a corresponding media program, the remaining portion being proportional in size to a remaining time thereof.

7. The method of claim 6, wherein the elapsed portion is displayed in a first color and the remaining portion is displayed in a second color.

8. A system for indicating a completion status of a media program, the system comprising:
an electronic program guide (EPG) component for displaying an EPG having first and second axes and a plurality of elements, the first axis corresponding to a plurality of media providers, the second axis corresponding to a plurality of time slots, each element corresponding to a media program; and
a completion status component configured to display a line indicating a current time across at least a portion of the EPG, wherein the line is perpendicular to the second axis and bisects an element of the EPG into an elapsed portion and a remaining portion, the elapsed portion being proportional in size to an elapsed time of a media program corresponding to the element, the remaining portion being proportional in size to a remaining time thereof wherein the completion status component is further configured to generate a separate graph of elapsed time versus running time for a first media program when the element corresponding to the first media program cannot be fully displayed within the plurality of time slots associated with the second axis, the graph indicating to a user the elapsed proportion of the first media program without requiring the user to refer to other portions of the EPG indicating a start time and an end time associated with the first media program, the separate graph being positioned upon the corresponding element in the EPG without the necessity of user input.

9. The system of claim 8, wherein the line bisects a plurality of elements of the EPG.

10. The system of claim 8, wherein the completion status component is configured to move the line along the second axis to indicate a change in the current time.

11. The system of claim 8, wherein the media program is selected from the group consisting of a television program, a radio program, a streaming video program, and a streaming audio program.

12. The method of claim 8, wherein the separate graph is selected from the group consisting of a pie chart and a ratio bar graph.

13. The system of claim 8, wherein the separate graph comprises an elapsed portion and a remaining portion, the elapsed portion being proportional in size to an elapsed time of a corresponding media program, the remaining portion being proportional in size to a remaining time thereof.

14. The system of claim 13, wherein the elapsed portion is displayed in a first color and the remaining portion is displayed in a second color.

15. A user interface for indicating a completion status of a media program, the user interface comprising:
an electronic program guide (EPG) having first and second axes and a plurality of elements, the first axis corresponding to a plurality of media providers, the second axis corresponding to a plurality of time slots, each element corresponding to a media program;
a line indicating a current time displayed across at least a portion of the EPG, wherein the line is perpendicular to the second axis and bisects an element of the EPG into an elapsed portion and a remaining portion, the elapsed portion being proportional in size to an elapsed time of a media program corresponding to the element, the remaining portion being proportional in size to a remaining time thereof; and
a separate graph of elapsed time versus running time for a first media program displayed when a portion of the element corresponding to the first media program cannot be displayed within the plurality of time slots currently associated with the second axis, the graph indicating to a user the elapsed proportion of the first media program without requiring the user to refer to other portions of the EPG indicating a start time and an end time associated with the first media program, wherein the separate graph is positioned upon the corresponding element in the EPG without the necessity of user input.

16. The user interface of claim 15, wherein the line bisects a plurality of elements of the EPG.

17. The user inter-face of claim 15, wherein the line is configured to move along the second axis to indicate a change in the current time.

18. The user interface of claim 15, wherein the media program as selected from the group consisting of a television program, a radio program, a streaming video program, and a streaming audio program.

19. The user interface of claim 15, wherein the separate graph is selected from the group consisting of a pie chart and a ratio bar graph.

20. The user interface of claim 15, wherein the separate graph comprises an elapsed portion and a remaining portion, the elapsed portion being proportional in size to an elapsed time of a corresponding media program, the remaining portion being proportional in size to a remaining time thereof.

21. The user interface of claim 20, wherein the elapsed portion is displayed in a first color and the remaining portion is displayed in a second color.

22. A method for indicating a completion status of a media program, the method comprising:
displaying an electronic program guide (EPG) having first and second axes and a plurality of elements, the first axis corresponding to a plurality of media providers, the second axis corresponding to a plurality of time slots, each element corresponding to a media program;
generating a separate graph of elapsed time versus running time for a first media program when the element corresponding to the first media program cannot be fully displayed within the plurality of time slots currently associated with the second axis, the graph indicating to a user the elapsed proportion of the first media program without requiring the user to refer to other portions of the EPG indicating a start time and an end time associated with the first media program; and
positioning the separate graph upon the corresponding element in the EPG without the necessity of user input.

23. The method of claim 22, wherein the graph comprises a pie chart.

24. The method of claim 22, wherein the graph comprises a ratio bar graph.

25. The method of claim 22, further comprising displaying an enlarged version of the graph at a location outside of the program guide in response to a user selection of a corresponding element in the program guide.

* * * * *